United States Patent
Benoliel et al.

[11] Patent Number: 6,129,315
[45] Date of Patent: Oct. 10, 2000

[54] INDEPENDENT LAUNCH LOCK MECHANISM

[75] Inventors: Alexander M. Benoliel, Redondo Beach; Gary J. Kayano, Los Angeles, both of Calif.

[73] Assignee: Hughes Electronics Corporation, El Segundo, Calif.

[21] Appl. No.: 09/081,582

[22] Filed: May 19, 1998

[51] Int. Cl.[7] .............................. B64G 1/00; B64G 1/62; B66C 1/34
[52] U.S. Cl. .................. 244/158 R; 244/161; 294/83.26
[58] Field of Search ............................... 244/158 R, 173, 244/168, 161, 137.4; 294/82.29, 82.33, 82.36

[56] References Cited

U.S. PATENT DOCUMENTS

| | | | |
|---|---|---|---|
| 4,176,360 | 11/1979 | Leavy et al. | 343/883 |
| 4,373,690 | 2/1983 | Stillman et al. | 244/173 |
| 4,929,135 | 5/1990 | Delarue et al. | 411/354 |
| 5,098,042 | 3/1992 | Viale | 244/173 |
| 5,520,476 | 5/1996 | Marks et al. | 244/161 |
| 5,603,595 | 2/1997 | Nygren, Jr. | 411/366 |
| 5,755,407 | 5/1998 | Aubret et al. | 244/161 |
| 5,810,296 | 9/1998 | Izumi | 244/173 |
| 5,909,860 | 6/1999 | Lee | 244/173 |

*Primary Examiner*—Peter M. Poon
*Assistant Examiner*—Charles R. Ducker, Jr.
*Attorney, Agent, or Firm*—Georgann S. Grunebach; M. W. Sales

[57] ABSTRACT

A launch lock mechanism having a clamp assembly that secures multiple independent brackets. The brackets are attached to components to be deployed from a satellite. A pyrotechnic separation device actuates the clamp assembly. Both the pyrotechnic device and the clamp assembly remain independent of the brackets and components after deployment.

20 Claims, 3 Drawing Sheets

INDEPENDENT LAUNCH LOCK MECHANISM

CROSS-REFERENCE TO RELATED APPLICATIONS

This application is related to co-pending U.S. patent application Ser. No. 09/081,911 entitled "Friction Clamp Restraint Mechanism for Springback Reflectors" filed simultaneously with the present application, the subject matter of such co-pending application being incorporated herein by reference.

The subject matter of this application was developed under Contract No. NAS5-32900 for the National Aeronautics and Space Administration, Tracking Data Relay Satellite (TDRS). The highest classification of the subject matter of this contract is Secret. The classification of the subject matter of this application has not been officially determined, but is believed to be unclassified.

TECHNICAL FIELD

The present invention relates to space and communications satellites, and more particularly, to a pyrotechnic launch lock mechanism for deploying components from a satellite.

BACKGROUND ART

It is well-known in the art to use pyrotechnic devices in order to deploy satellite components. Due to size and weight constraints, it is desirable to deploy multiple components using more than one pyrotechnic device.

Because of specific satellite designs, prior art devices that deploy multiple components require complicated pyrotechnic harness wiring that usually requires the harness to remain attached to at least one of the components after deployment. The harness adds unwanted size and weight to the deployed component, which is undesirable in space and communications applications. In the case of RF antennas, it is undesirable to attach the wire harness to the component to be deployed due to RF blockage caused by the harness in the antenna field of view. This problem is readily apparent in the Tracking and Data Relay Satellites (TDRS) that incorporate cross grain antenna subsystems.

In an attempt to overcome the disadvantages described above, a device that does not require the harness to remain attached to the deployed component has been developed. However, this device maintains several disadvantages. In particular, this prior art device includes several imbedded devises secured by a single pin. A pin puller is used to release the components. The moment release is accomplished by a monoball located in the center of the clevis arrangement.

The design of the prior art device also relies on sliding friction between components during the deployment phase. Sliding friction is not always predictable thereby decreasing the reliability of the deployment. Another factor that decreases the reliability of the device, especially when taken in conjunction with the design's reliance on sliding friction, is the relative twisting action that occurs at each clevis. The twisting action causes the clevis to be pulled at an angle, which may bind the device, creating a considerable risk to the successful deployment of the launch lock.

The prior art device also requires the use of a higher strength pin puller with greater throw than is conventionally available, adding unwanted cost and complexity to the device.

What is needed is a device capable of locking and unlocking components that does not rely on sliding friction action once the components are deployed to allow them to separate freely. A device is also needed that has a minimal deployed mass by keeping the pyrotechnic device separate from the deployed components.

SUMMARY OF THE INVENTION

The present invention is an independent pyrotechnic launch lock mechanism that secures multiple components together in either a moment fixed or a moment released constraint. The components to be deployed are independent of the lock mechanism, the pyrotechnic device and the wiring harness after deployment.

The present invention is a releasable securing mechanism having a clamp assembly that secures multiple independent brackets. The brackets are attached to components (i.e. antennas) to be deployed from a satellite. A pyrotechnic separation nut device actuates the clamp assembly to release the clamps and allow deployment of the components.

The clamp and pyrotechnic components are independent from the components to be deployed. They can be attached, for example, to a boom or strut connected to the body of the satellite. Therefore, the added mass of the pyrotechnic device, as well as the harness, remains with the clamp assembly and satellite body, and not with the deployed components.

It is an object of the present invention to provide a launch lock mechanism that deploys components from a satellite without the added mass of a pyrotechnic device and harness. It is a further object of the present invention to provide a highly reliable, launch lock mechanism that does not rely on sliding friction action.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
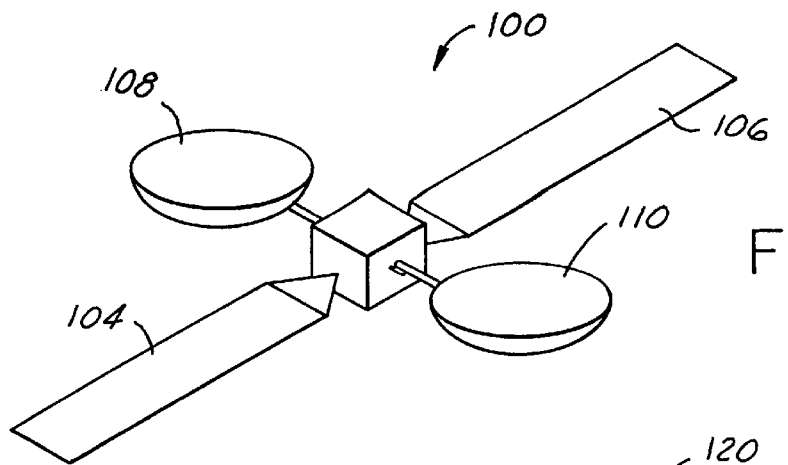
FIG. 1 is a view of a satellite in the deployed configuration in which the present invention is applicable.
Figure 3:
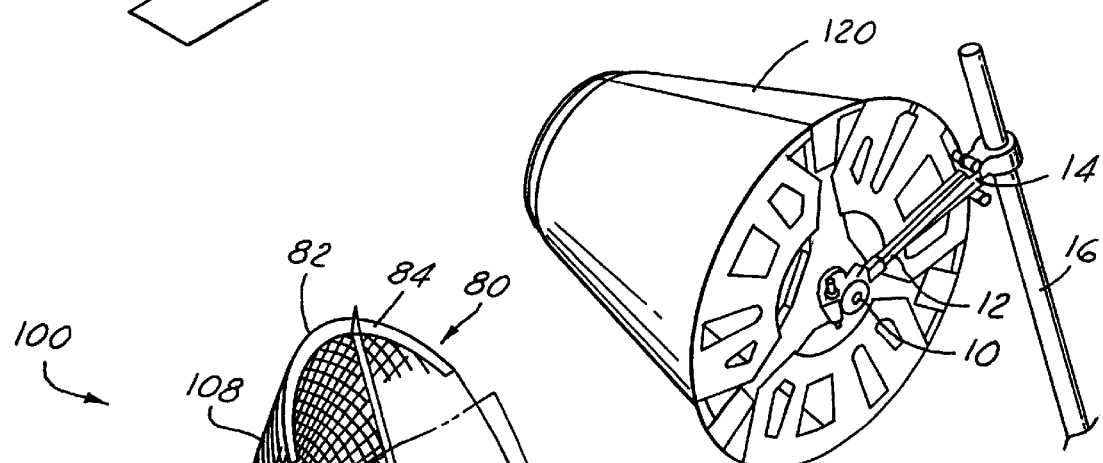
FIG. 3 is a perspective view of one radome panel attached to the assembly of the present invention.
Figure 2:
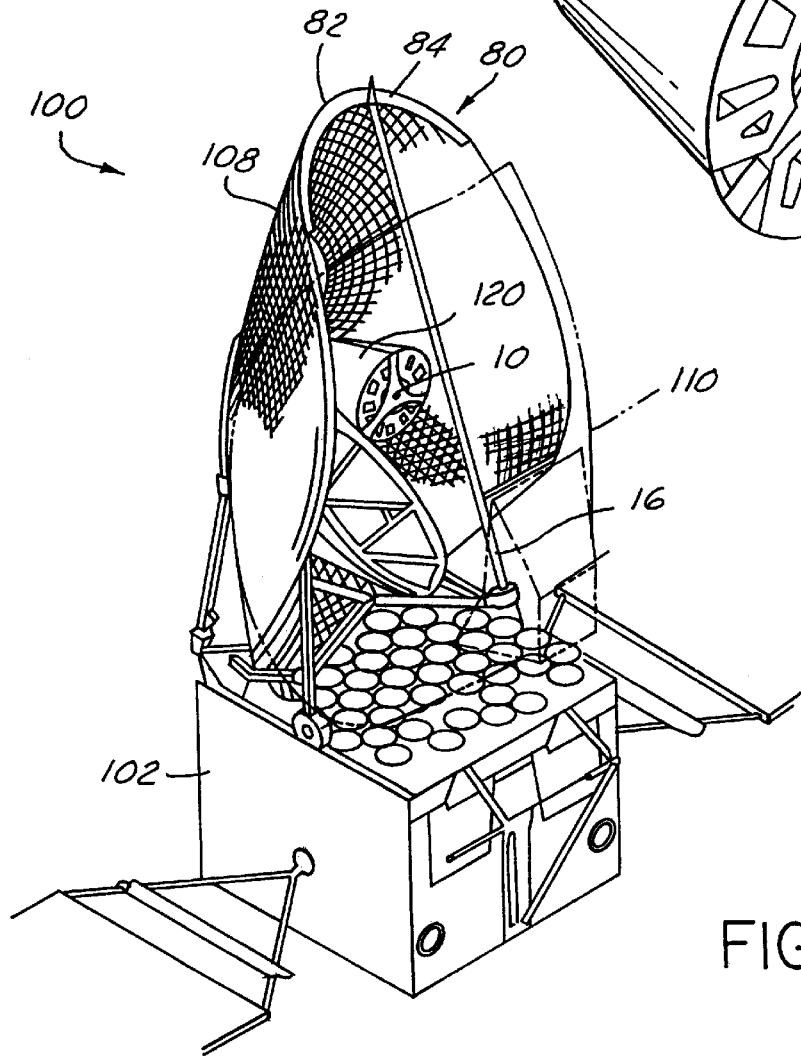
FIG. 2 is a partial view of the satellite shown in FIG. 1 in its stowed position.

Referring to FIGS. 1 through 9, and in particular to FIG. 1, there is shown a Tracking and Data Relay Satellite (TDRS) 100 that utilizes the launch lock mechanism of the present invention. It is to be understood that the system shown in FIGS. 1 through 3 is merely descriptive and that the launch lock mechanism of the present invention may be used for other purposes and in conjunction with other systems.

The TDRS 100 has a body 102, a pair of solar panels 104, 106 and a pair of Single Access (SA) Antenna Subsystems 108, 110. FIG. 1 depicts the satellite 100 in its deployed and operational configuration. During launch and transport into space, the solar panels and reflector antennas are folded up around or on the body 102 into a compact package. In this regard, the two antennas are folded up and individually curled up into the position shown in FIG. 2 in the stowed position (only one antenna 108 is shown in FIG. 2; antenna 110 is shown in phantom).

Each of the antenna subsystems 108 and 110 has a radome panel 120 attached to it (only one of which is shown in FIG. 2). The radome panels 120 are each attached to the launch lock mechanism 10 of the present invention. An enlarged view of a radome panel 120 is shown in FIG. 3.

The inventive launch lock mechanism 10 is attached to a strut member 12 which is attached by a support member 14 to a boom member 15. The boom member 15 in turn is attached to the body 102 of the satellite. In this regard, it is to be understood that the mechanism 10 can be attached to any conventional type of supporting structure or system, so long as it is positioned between the stowed antennas 108, 110 and on a structure which is separate and independent from the antennas and which remains on the body and not with the antenna when the antennas are deployed.

Figure 4:
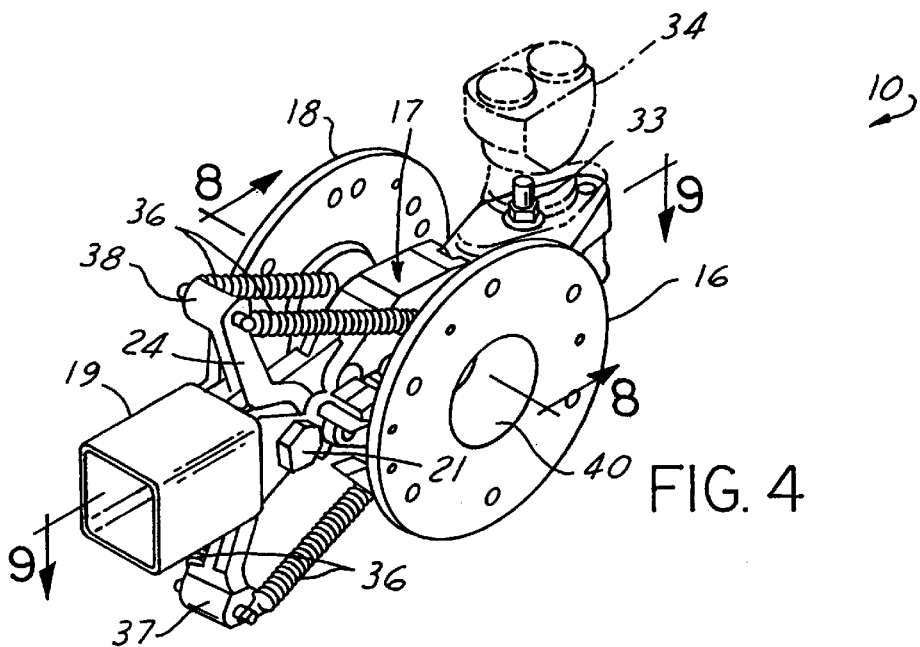
FIG. 4 is a perspective view of the launch lock mechanism of the present invention.
Figure 5:
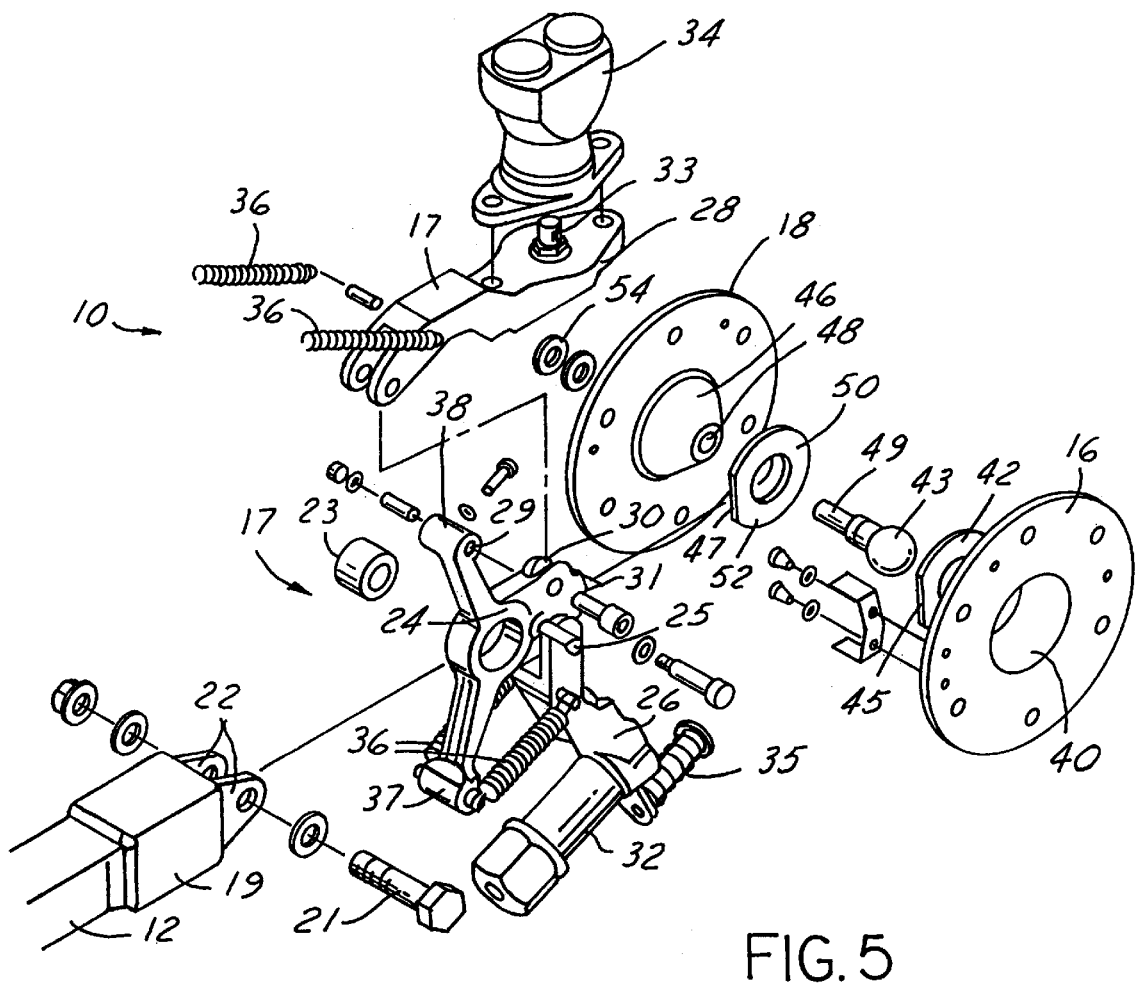
FIG. 5 is an exploded view the mechanism of the present invention.

FIG. 4 is a perspective view of the launch lock mechanism 10 of the present invention, while FIG. 5 is an exploded view of mechanism 10 showing its individual components. The lock mechanism 10 generally includes a first deployable bracket 16, a second deployable bracket 18, a clamp assembly 17, and a ball joint 43 having a threaded stem 49 located between the two deployable brackets 16, 18. A bracket 19 is attached to the clamp assembly and is used to connect to the strut member 12 (FIG. 3).

The clamp assembly 17 includes a base 24 which is pivotally attached to the bracket 19 by a bolt and nut assembly 21 which is positioned through flanges 22 and a spherical bearing 23. The assembly 17 includes a first clamp arm 26 and a second clamp arm 28, both of which extend longitudinally from the bracket 19. Each clamp arm 26, 28 is pivotally attached by a separate pivot axis 25 and 27, respectively, on the base 24. The base 24 has stops 30 that limit the travel of the first and second clamp arms 26, 28. The stops 30 limit the travel of the first and second clamp arms 26, 28 when the lock assembly is actuated to deploy the first and second brackets 16, 18. The base 24 also has rails 31 extending perpendicular to the direction of travel of the first and second clamp arms 26, 28 for guiding the first and second brackets 16, 18 upon deployment.

The first clamp arm 26 has a bolt catcher tube 32 extending therefrom for catching a bolt 33 as it is released by a pyrotechnic device 34 attached to the second clamp arm 28. The first and second clamp arms 26, 28 have a contoured surface 29 for reasons that will be described in detail below.

A compression spring 35 is fixed to one end of the first clamp arm 26 and is compressed between the first and second clamp arms 26, 28 when the mechanism is in the locked position and held together by the bolt 33 in the pyrotechnic device 34. The pyrotechnic device 34 shown is a separation nut assembly. It is to be understood that one skilled in the art could apply another type of pyrotechnic device to achieve similar results.

The first and second clamp arms 26, 28 have extension springs 36 for actuating the clamp assembly 17. The extension springs 36 are attached to each clamp arm 26, 28 at one end and to the base 24 at the opposite end. While more than one extension spring is shown for each clamp arm 26, 28, it is to be understood that variations are possible without departing from the scope of the invention. For example, it is possible to actuate the clamp arms 26, 28 using only one extension spring 36 for each clamp arm 26, 28 (not shown).

The base 24 has a first extension member 37 that receives the extension springs 36 from the first clamp arm 26 and a second extension member 38 that receives the extension springs 36 from the second clamp arm 28. The distance between the clamp arms 26, 28 and the ends of the extension members 37, 38, respectively, creates the tension in the extension springs 36 that actuates the clamp assembly 17 upon firing the pyrotechnic device 34. The location of the extension members 37, 38 also serves to open the clamp arms 26, 28 in the desired direction when the tension in the springs 36 is released.

The first deployable bracket 16 has a conical extension 40 having a flange 42 at one end, also known as a shear cone. It should be understood that this portion of the bracket can be any shape. The base 24 supports the flange 42. The flange 42 and the flange 52 form the conical shape when put together. The flange 42 has an opening 44 therein for receiving a ball joint 43. The flange 42 has one flat edge 45 that abuts one of the rails 31 on the base 24. The rail 31 guides the deployment of the first bracket 16.

Figure 8:
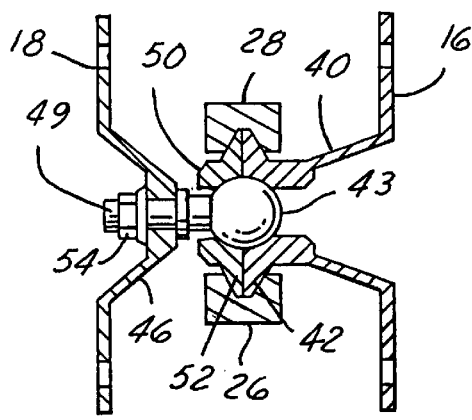
FIG. 8 is a cross sectional view of the clamp assembly and deployable brackets taken along line 8—8 of FIG. 4.
Figure 9:
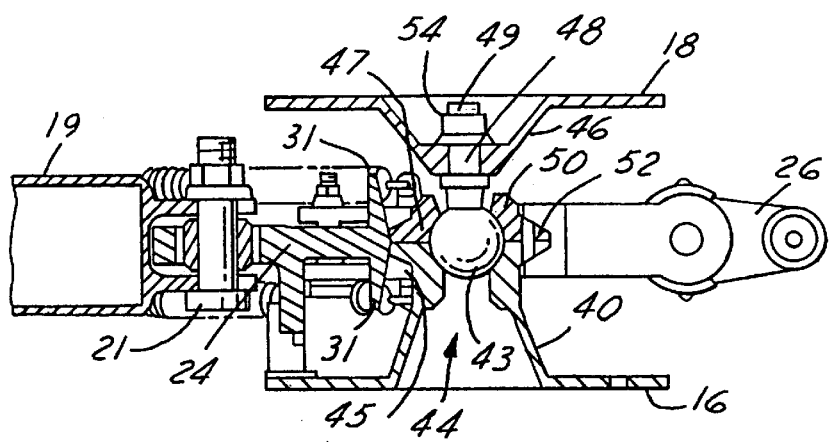
FIG. 9 is a cross sectional view of the clamp assembly and deployable brackets taken along line 9—9 of FIG. 4.

The second deployable bracket 18 has a conical extension 46 having an opening 48 therethrough. As with the conical extension 48 of the first deployable bracket 16, this portion of the bracket can also be any shape. A floating collar 50 having a flange 52, similar to the flange 42 of the first deployable bracket 16, is positioned between the ball joint 43 and the conical extension 46. The flange 52 of the floating collar 50 has one flat edge 47 that abuts a rail 31 on the base 24 for the same purpose as described above, that is, to guide the deployment of the second bracket 18. The threaded stem 49 of the ball joint 43 passes through the opening 48 of the flange 52 and the second deployable bracket 18 where it is fixed with a fastener 54, such as a nut and washer. The arrangement between the deployable brackets 16, 18 and the ball joint 43 is best shown in FIGS. 8 and 9. The ball joint 43 is located between the first and second deployable brackets 16, 18.

Figure 6:
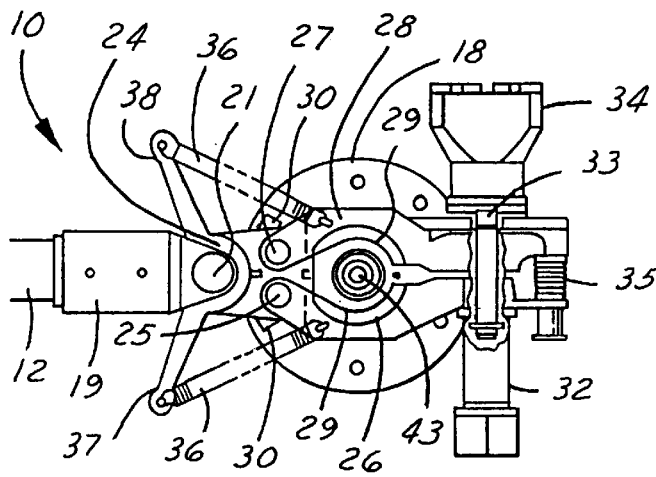
FIG. 6 is a side view of the present invention shown in partial cross section with one of the deployable components visible and in the stowed position.

FIG. 6 shows the launch lock mechanism 10 of the present invention in a stowed and locked configuration with only one deployable bracket being depicted for clarity purposes. In the locked configuration, the extension springs 36 are tensioned between the first and second extension members 37, 38 and the first and second clamp arms 26, 28. The pyrotechnic device 34 is positioned on the second clamp arm 28 and, through a bolt 33, is used to hold the two clamp arms together until it receives an actuation signal and cuts the bolt to allow the antennas to deploy.

The contoured surfaces 29 of the first and second clamp arms 26, 28 surround the flanges 42, 52 and hold the deployable brackets 16, 18 in a stowed position.

The ball joint 43 allows the second deployable bracket 18 to rotate in a moment released configuration while the launch lock mechanism 10 is in the locked position. If desirable, it is also possible to configure a moment fixed by securing, as by welding, machining or any other suitable method, the ball joint 43 to the floating collar 50 to prohibit the second deployable bracket from rotating.

The compression spring 35 is compressed between the first and second clamp arms 26, 28 in the locked or stowed configuration. When the pyrotechnic device 34 is fired, the compression spring 35 releases, initiating the movement of the first and second clamp arms 26, 28 toward their unlocked or deployed positions. Springs 36 further aid in separating the clamp arms and keeping them in their open position. This allows the release of the radome panels 120 and the antennas 108, 110 from their stowed position and allows them to be moved to their deployed positions.

Figure 7:
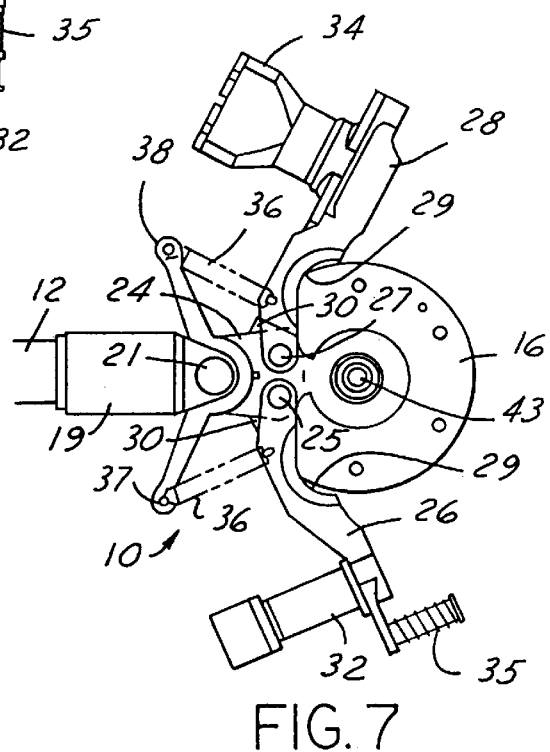
FIG. 7 is a side view of the present invention shown in partial cross-section after deployment.

FIG. 7 is a side view of the launch lock mechanism 10 of the present invention in its unlocked, or deployed, configuration. To unlock the mechanism 10, the pyrotechnic device 34 releases a bolt 33 located within the device 34, and the bolt 33 passes into the bolt catcher tube 32 where it is retained. The tension in the compression spring 35 is then released and, similarly, the spring force in the extension springs 36 is released causing the first and second clamp arms 26, 28 to pivot about their respective pivot axes on the base 24. Stops 30 prevent the first and second clamp arms 26, 28 from over travel.

Once the clamp arms 26, 28 are opened, the deployable brackets 16, 18 are released and guided by the rails 31 to a deployed state. Because the first and second brackets 16, 18 are not fixed to the clamp assembly 14, they are released cleanly and freely without the added weight of the pyrotechnic device 34 or its associated harness (not shown).

The wiring harness and activation system for firing the pyrotechnic device, as well as the pyrotechnic device, can be any of those well-known and commonly used in the satellite field. Any conventional system and device can be utilized with the present invention.

FIGS. 8 and 9 are cross-sectional views of the launch lock mechanism 10 of the present invention in a locked configuration. These Figures show the arrangement of the first deployable bracket 16, the conical extension 40 having a flange 42, the floating collar 50, and the conical extension 46 of the second deployable bracket 18, and also show the manner in which these components interact with the ball joint 43. When the first and second clamp arms 26, 28 are in the locked position, they secure the flanged surfaces 42, 52 thereby retaining the first and second deployable brackets 16, 18 in the positions shown.

It is clear the lock mechanism 10 of the present invention does not rely on sliding friction between components because the deployable brackets 16, 18 of the present invention are freely released from the mechanism 10 upon deployment. Additionally, the mechanism 10 of the present invention allows for minimal deployed mass because the pyrotechnic device 34 is retained on the clamp assembly 14 and is not part of the deployable brackets 16, 18 as in prior art devices.

The subject matter of related U.S. application Ser. No. 09/081,911, entitled "Friction Clamp Restraint Mechanism for Springback Reflectors" relates to a pyrotechnic release mechanism 80 (see FIG. 2) which is used to hold the outer edges 82 of the reflector antennas 108, 110 in their curled positions while stowed. When the reflectors are ready to be deployed, the release mechanism 80 releases frame members 84 allowing the reflectors 108, 110 to assume their normal positions.

While particular embodiments of the invention have been shown and described, numerous variations and alternate embodiments will occur to those skilled in the art. Accordingly, it is intended that the invention be limited only in terms of the appended claims.

What is claimed is:

1. A launch lock mechanism comprising:
   a base having first and second pivot axes;
   a first clamp arm pivotally attached to said first pivot axis;
   a second clamp arm pivotally attached to said second pivot axis;
   a first biasing member attached between said first clamp arm and said base;
   a second biasing member attached between said second clamp arm and said base;
   a pyrotechnic device for releasably holding said first and second clamp arms together;
   a first bracket member having a first central member releasably held between said first and second clamp arms;
   a second bracket member having a second central member releasably held between said first and second clamp arms;
   wherein when said pyrotechnic device is fired said first and second central members are released from said first and second clamp arms.

2. The launch lock mechanism as claimed in claim 1 wherein said base further comprises stop members for limiting the travel of said first and second clamp arms after being released.

3. The launch lock mechanism as claimed in claim 1 wherein said base further comprises rail members extending substantially perpendicular to the direction of travel of said first and second clamp arms, said rails for guiding travel of said first and second brackets upon deployment.

4. The launch lock mechanism as claimed in claim 1 wherein said pyrotechnic device is a separation nut-type pyrotechnic device.

5. The launch lock mechanism as claimed in claim 1 wherein said first biasing member comprises two extension springs and said second biasing member comprises two extension springs.

6. The launch lock mechanism as claimed in claim 1 further comprising a ball joint between said first and second central members.

7. The launch lock mechanism as claimed in claim 1 further comprising a compression spring positioned between said first and second clamp arms.

8. The launch lock mechanism as claimed in claim 4 wherein said pyrotechnic device further comprises a fastener attached to said first and second clamp arms.

9. The launch lock mechanism as claimed in claim 5 wherein said base further comprises a first extension member for receiving said two extension springs between said first clamp arm and said base and a second extension member for receiving said two extension springs between said second clamp arm and said base.

10. The launch lock mechanism as claims in claim 1 wherein said first central member further comprises a conical central member and said second central member further comprises a conical central member.

11. The launch lock mechanism as claimed in claim 8 wherein said first conical central member further comprises a flange.

12. The launch lock mechanism as claimed in claim 8 wherein a collar having a flange is positioned between said flange of said first central member and said second conical central member.

13. The launch lock mechanism as claimed in claim 12 further comprising a ball joint engaged to said second conical central member, said collar positioned between said second conical central member and said ball joint.

14. The launch lock mechanism as claimed in claim 12 wherein said flange of said first conical central member further comprises a flat edge abutting said base and said flange of said collar further comprises a flat edge abutting said base.

15. The launch lock mechanism as claimed in claim 13 wherein said ball joint is fixed to said collar resulting in a moment fixed configuration.

16. A launch lock mechanism comprising:
   a base having first and second pivot axes, said base having stop members, said base having rail members extending horizontally from said base, said base having first and second extension members;
   a first clamp arm pivotally attached to said first pivot axis, one of said stops on said base for limiting a path of travel of said first clamp arm;
   a second clamp arm pivotally attached to said second pivot axis, one of said stops on said base for limiting a path of travel of said second clamp arm;
   a first biasing member attached between said first clamp arm and said base wherein said first biasing member comprises two springs attached between said first clamp arm and said first extension member of said base;
   a second biasing member attached between said second clamp arm and said base wherein said second biasing member comprises two springs attached between said second clamp arm and said second extension member of said base;
   a pyrotechnic device for releasably holding said first and second clamp arms together, said pyrotechnic device having a fastener therein, said fastener in communication with said first and second clamp arms;
   a first bracket member having a conical extension having an opening and a flange releasably held between said first and second clamp arms, said flange having a flat edge abutting one of said rail members on said base for guiding a path of travel of said first bracket upon deployment;
   a second bracket having a conical extension and an opening therethrough;
   a ball joint engaged to said conical extension of said second bracket;
   a collar positioned between said ball joint and said conical extension of said second bracket, said collar having a flange releasably held between said first and second clamp arms, said flange of said first bracket and said flange of said floating collar abut each other, said flange of said collar having a flat edge abutting one of said rail members of said base for guiding a path of travel of said second bracket upon deployment;
   wherein when said pyrotechnic device is fired said fastener is cut releasing said first and second bracket members from said clamp arms.

17. A satellite system having a pair of reflectors comprising:
   a pair of panels disposed between said pair of reflectors;
   a launch lock mechanism attached between said pair of panels, said launch lock mechanism comprising:
      a base having first and second pivot axes;
      a first clamp arm pivotally attached to said first pivot axis;
      a second clamp arm pivotally attached to said second pivot axis;
      a first biasing member attached between said first clamp arm and said base;
      a second biasing member attached between said second clamp arm and said base;
      a pyrotechnic device for releasably holding said first and second clamp arms together;
      a first bracket member having a first central member releasably held between said first and second clamp arms;
      a second bracket member having a second central member releasably held between said first and second clamp arms;
   whereby when said pyrotechnic device is actuated said clamp arms are released from each other releasing said first and second bracket members.

18. The satellite system as claimed in claim 17 wherein said base further comprises stop members for limiting the travel of said first and second clamp arms after being released.

19. The satellite system as claimed in claim 17 wherein said base further comprises rail members extending substantially perpendicular to the direction of travel of said first and second clamp arms, said rail members for guiding travel of said first and second brackets.

20. The satellite system as claimed in claim 17 wherein said launch lock mechanism further comprises:
   a ball joint;
   said first central member further comprises a conical central member having a flange;
   said second central member further comprises a conical central member having a collar;
   wherein said collar is positioned between said second conical central member and said ball joint.

* * * * *